(12) United States Patent
Jooste

(10) Patent No.: US 9,514,242 B2
(45) Date of Patent: Dec. 6, 2016

(54) PRESENTING DYNAMICALLY CHANGING IMAGES IN A LIMITED RENDERING ENVIRONMENT

(75) Inventor: Sarel Kobus Jooste, Novato, CA (US)

(73) Assignee: VMware, Inc., Palo Alto, CA (US)

( * ) Notice: Subject to any disclaimer, the term of this patent is extended or adjusted under 35 U.S.C. 154(b) by 766 days.

(21) Appl. No.: 13/449,076

(22) Filed: Apr. 17, 2012

(65) Prior Publication Data

US 2013/0050253 A1 Feb. 28, 2013

Related U.S. Application Data

(60) Provisional application No. 61/528,614, filed on Aug. 29, 2011.

(51) Int. Cl.

| | |
|---|---|
| G09G 5/00 | (2006.01) |
| G06T 11/60 | (2006.01) |
| G06F 17/00 | (2006.01) |
| G06F 17/30 | (2006.01) |
| G06F 3/14 | (2006.01) |
| H04L 29/08 | (2006.01) |
| H04L 29/06 | (2006.01) |
| H04N 21/231 | (2011.01) |
| G06F 9/44 | (2006.01) |
| H04N 21/4402 | (2011.01) |
| H04N 21/2343 | (2011.01) |
| G09G 5/14 | (2006.01) |

(52) U.S. Cl.
CPC ......... *G06F 17/30899* (2013.01); *G06F 3/14* (2013.01); *G06F 17/3028* (2013.01); *G06F 17/30902* (2013.01); *G06F 17/30905* (2013.01); *G06F 9/4445* (2013.01); *G09G 5/14* (2013.01); *G09G 2340/10* (2013.01); *G09G 2350/00* (2013.01); *G09G 2370/027* (2013.01); *H04L 65/4084* (2013.01); *H04L 67/02* (2013.01); *H04N 21/23106* (2013.01); *H04N 21/234327* (2013.01); *H04N 21/440227* (2013.01)

(58) Field of Classification Search
CPC .................. G06F 17/30905; G06F 17/30899
USPC ......... 345/522; 715/234, 243, 245; 707/693; 709/219
See application file for complete search history.

(56) References Cited

U.S. PATENT DOCUMENTS

| | | |
|---|---|---|
| 5,214,519 A | 5/1993 | Faulhaber et al. |
| 5,333,212 A | 7/1994 | Lightenberg |
| 5,363,483 A | 11/1994 | Jones |
| 6,571,245 B2 | 5/2003 | Huang et al. |
| 6,591,266 B1 | 7/2003 | Li et al. |
| 6,813,641 B2 | 11/2004 | Fomenko et al. |
| 6,915,486 B2 | 7/2005 | Li et al. |
| 6,950,101 B2 | 9/2005 | Hunt et al. |

(Continued)

*Primary Examiner* — Jin-Cheng Wang

(57) ABSTRACT

Methods, systems, and techniques for presenting dynamically changing images in a limited rendering environment are described. Example embodiments provide a client display manager that is configured to receive image blocks representing modifications or updates to a dynamically changing image. The client display manager may then layer the received image blocks upon one another, and then cause the layered image blocks to be presented on a display device as a single, composited image. In some embodiments, multiple image blocks may be coalesced or otherwise combined into a single image transmitted to the client display manager, where regions of the single image that are not occupied by the multiple image blocks are transparent.

30 Claims, 9 Drawing Sheets

(56) References Cited

U.S. PATENT DOCUMENTS

| | | | |
|---|---|---|---|
| 6,983,421 B1 | 1/2006 | Lahti et al. | |
| 7,000,008 B2 | 2/2006 | Bautista-Lloyd | |
| 7,308,490 B2 | 12/2007 | Peiffer et al. | |
| 7,349,905 B1 | 3/2008 | Jooste | |
| 7,418,472 B2 | 8/2008 | Shoemaker | |
| 7,426,578 B2 | 9/2008 | Jones et al. | |
| 7,502,838 B2 | 3/2009 | Franco et al. | |
| 7,522,536 B2 | 4/2009 | Roberts | |
| 7,703,024 B2 | 4/2010 | Kautzleben et al. | |
| 7,805,523 B2 | 9/2010 | Mitchell et al. | |
| 7,805,670 B2 | 9/2010 | Lipton et al. | |
| 7,882,173 B2 | 2/2011 | Hirsch et al. | |
| 7,890,598 B2 | 2/2011 | Lakamp | |
| 8,112,473 B2 | 2/2012 | Saillet | |
| 8,209,372 B2 | 6/2012 | Abdo et al. | |
| 8,341,270 B2 | 12/2012 | Mazzaferri et al. | |
| 8,400,491 B1 | 3/2013 | Panpaliya et al. | |
| 8,572,162 B2 | 10/2013 | Gokaraju et al. | |
| 8,621,031 B2 | 12/2013 | Desai | |
| 8,769,400 B1* | 7/2014 | Thomas et al. | 715/235 |
| 8,913,067 B1* | 12/2014 | Kokkevis | 345/522 |
| 2002/0063715 A1 | 5/2002 | Foran | |
| 2002/0111995 A1 | 8/2002 | Mansour et al. | |
| 2003/0093585 A1 | 5/2003 | Allan | |
| 2003/0163510 A1 | 8/2003 | Janssen | |
| 2004/0054671 A1 | 3/2004 | Cohen et al. | |
| 2004/0103438 A1 | 5/2004 | Yan | |
| 2004/0177147 A1 | 9/2004 | Joshi et al. | |
| 2005/0138122 A1 | 6/2005 | Boehringer et al. | |
| 2005/0149529 A1 | 7/2005 | Gutmans | |
| 2005/0198364 A1 | 9/2005 | Val et al. | |
| 2005/0256923 A1 | 11/2005 | Adachi | |
| 2006/0039466 A1 | 2/2006 | Emerson et al. | |
| 2006/0039468 A1 | 2/2006 | Emerson | |
| 2006/0082583 A1 | 4/2006 | Leichtling et al. | |
| 2006/0156315 A1 | 7/2006 | Wood et al. | |
| 2006/0168526 A1 | 7/2006 | Stirbu | |
| 2006/0174026 A1 | 8/2006 | Robinson et al. | |
| 2006/0203007 A1 | 9/2006 | Bullard et al. | |
| 2006/0212514 A1 | 9/2006 | Saillet | |
| 2006/0248200 A1 | 11/2006 | Stanev | |
| 2006/0265662 A1 | 11/2006 | Gertzen | |
| 2007/0005990 A1 | 1/2007 | Sathish | |
| 2007/0009182 A1 | 1/2007 | Yamauchi | |
| 2007/0046980 A1 | 3/2007 | Coleman et al. | |
| 2007/0073730 A1 | 3/2007 | Jun | |
| 2007/0110303 A1 | 5/2007 | Bhattacharjya | |
| 2007/0174429 A1 | 7/2007 | Mazzaferri et al. | |
| 2007/0174474 A1 | 7/2007 | Zhong | |
| 2007/0204003 A1 | 8/2007 | Abramson | |
| 2007/0271332 A1 | 11/2007 | Joshi et al. | |
| 2008/0005236 A1 | 1/2008 | Schmieder | |
| 2008/0094411 A1 | 4/2008 | Parenteau | |
| 2008/0098301 A1* | 4/2008 | Black et al. | 715/246 |
| 2008/0114889 A1 | 5/2008 | Deshpande | |
| 2008/0313545 A1 | 12/2008 | Patel | |
| 2008/0320531 A1* | 12/2008 | Kim et al. | 725/87 |
| 2009/0100125 A1 | 4/2009 | McDowell | |
| 2009/0196406 A1 | 8/2009 | Brown et al. | |
| 2009/0254664 A1 | 10/2009 | Wada | |
| 2009/0254982 A1 | 10/2009 | Jansen et al. | |
| 2009/0271779 A1 | 10/2009 | Clark | |
| 2009/0313322 A1 | 12/2009 | Sheehan et al. | |
| 2009/0319249 A1 | 12/2009 | White et al. | |
| 2009/0327468 A1 | 12/2009 | Hirsch et al. | |
| 2010/0023855 A1* | 1/2010 | Hedbor et al. | 715/234 |
| 2010/0054618 A1 | 3/2010 | Kawazoe et al. | |
| 2010/0077058 A1* | 3/2010 | Messer | H04L 67/02 709/219 |
| 2010/0115023 A1 | 5/2010 | Peled | |
| 2010/0138476 A1 | 6/2010 | Gokaraju et al. | |
| 2010/0138744 A1 | 6/2010 | Kamay | |
| 2010/0220592 A1 | 9/2010 | Pan | |
| 2010/0223348 A1 | 9/2010 | Przybysz et al. | |
| 2010/0250747 A1 | 9/2010 | Karaoguz et al. | |
| 2010/0268694 A1* | 10/2010 | Denoue et al. | 707/693 |
| 2010/0269048 A1 | 10/2010 | Pahlavan et al. | |
| 2010/0325300 A1 | 12/2010 | Vasters et al. | |
| 2010/0332654 A1 | 12/2010 | Bose | |
| 2011/0082946 A1 | 4/2011 | Gopalakrishnan | |
| 2011/0096828 A1 | 4/2011 | Chen | |
| 2011/0141123 A1 | 6/2011 | Kumar et al. | |
| 2011/0184993 A1 | 7/2011 | Chawla et al. | |
| 2011/0258532 A1* | 10/2011 | Ceze | G06F 17/30902 715/234 |
| 2011/0276619 A1 | 11/2011 | Khan et al. | |
| 2011/0276900 A1 | 11/2011 | Khan et al. | |
| 2011/0316965 A1 | 12/2011 | Moore et al. | |
| 2012/0060083 A1* | 3/2012 | Yuan et al. | 715/234 |
| 2012/0066679 A1 | 3/2012 | Pappas et al. | |
| 2012/0076197 A1 | 3/2012 | Byford et al. | |
| 2012/0102392 A1* | 4/2012 | Reesman et al. | 715/243 |
| 2012/0110201 A1 | 5/2012 | Fubeck | |
| 2012/0117145 A1 | 5/2012 | Clift et al. | |
| 2012/0120320 A1* | 5/2012 | Chowdhry et al. | 348/586 |
| 2012/0131645 A1 | 5/2012 | Harm | |
| 2012/0151373 A1 | 6/2012 | Kominac et al. | |
| 2012/0159311 A1* | 6/2012 | Hanssen | G06F 17/30905 715/243 |
| 2012/0256949 A1* | 10/2012 | Treat | G06F 9/4443 345/629 |
| 2012/0260157 A1* | 10/2012 | Zhu | G06F 17/30902 715/234 |
| 2012/0324037 A1 | 12/2012 | Ramadas | |
| 2013/0054672 A1* | 2/2013 | Stilling et al. | 709/202 |
| 2013/0055113 A1 | 2/2013 | Chazin et al. | |
| 2013/0335320 A1* | 12/2013 | Mori et al. | 345/156 |

* cited by examiner

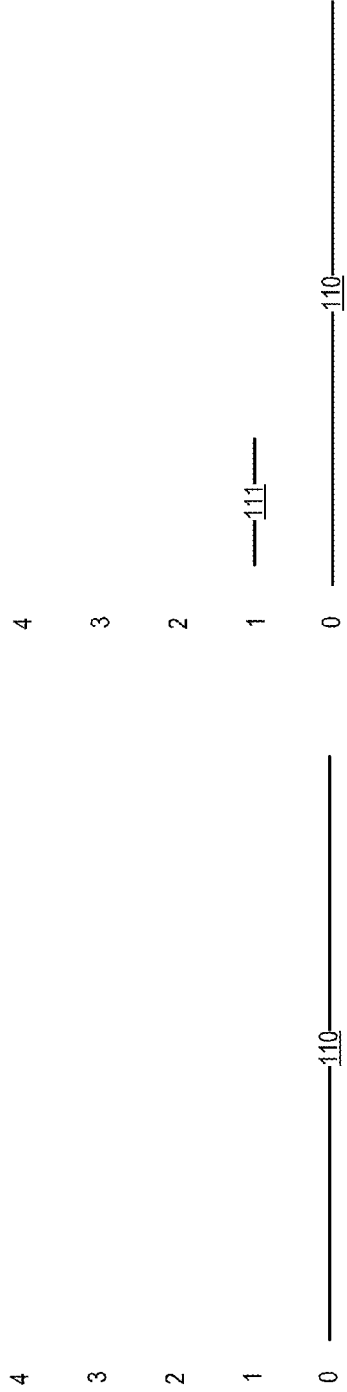

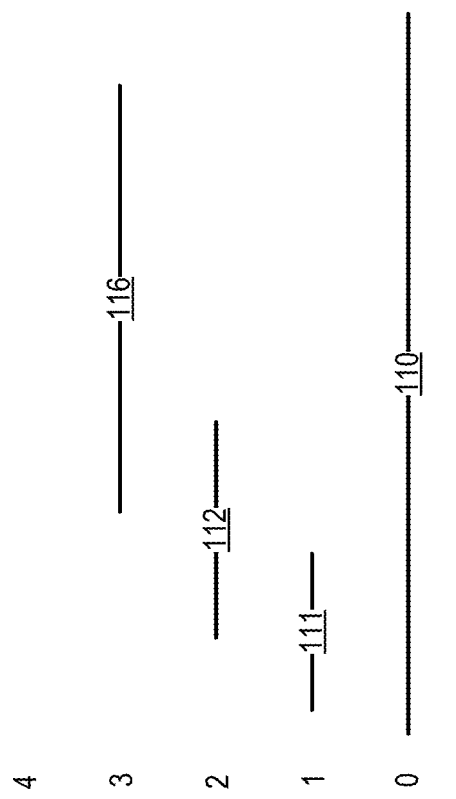

PRESENTING DYNAMICALLY CHANGING IMAGES IN A LIMITED RENDERING ENVIRONMENT

CROSS-NOTING TO RELATED APPLICATIONS

This application is related by subject matter to U.S. patent application Ser. No. 13/162,365 filed on Jun. 16, 2011 and entitled "DELIVERY OF A USER INTERFACE USING HYPERTEXT TRANSFER PROTOCOL," which is incorporated herein by reference in its entirety.

This application also claims the benefit of U.S. Provisional Patent Application No. 61/528,614 filed on Aug. 29, 2011 and entitled "PRESENTING DYNAMICALLY CHANGING IMAGES IN A LIMITED RENDERING ENVIRONMENT," which is incorporated herein by reference in its entirety.

TECHNICAL FIELD

The present disclosure relates to methods, techniques, and systems for presenting dynamically changing images in a limited rendering environment and, in particular, to methods, techniques, and systems for layering image updates in display environments that do not provide direct access to a frame buffer.

BACKGROUND

A frame buffer is or includes a physical or virtual component or module that represents at least a portion of a single frame of screen data. Typically, a frame buffer is represented by or as an array of memory locations that are mapped or otherwise associated with graphics hardware (e.g., a graphics card) that outputs video signals based on the contents (e.g., pixel values) of the buffer.

Many environments (e.g., devices, systems, interfaces) do not include or otherwise provide access to a frame buffer for displaying (e.g., presenting or rendering) image data. For example, embedded devices may only include simple graphics displays, and thus may not include a hardware frame buffer or corresponding software abstraction therefore. As another example, many Web browsers and their associated runtime environments may not include or provide access to a frame buffer or a corresponding software abstraction, such as a canvas or bit-block transfer (BitBlt) operation. For example, while HTML Version 5 includes a canvas element that supports 2D graphics operations, such as copying image data into a buffer for presentation on a display, HTML Version 4 (and prior versions) do not support or provide such an abstraction.

Known approaches for transmitting dynamically changing image data, such as updates to a user interface screen or video data, include transmitting only those portions of a dynamically changed image that have been recently updated. By only sending updated image portions, considerable network bandwidth may be preserved. However, such an approach is not well suited to a limited display environment, because such an environment does not include or provide access to a hardware or software frame buffer upon which such updates may be composited. In a limited display environment, such as within an HTML Version 4-compliant Web browser, the receiving entity (e.g., client) cannot readily draw updated image portions to the screen, such as by calling or invoking an operation to copy updated image portions into a frame buffer.

BRIEF DESCRIPTION OF THE DRAWINGS

FIGS. 3A-3F illustrate a sequence of image block layering configurations generated by an example embodiment.

FIGS. 4A-4C illustrate image block coalescing performed by an example embodiment.

DETAILED DESCRIPTION

Embodiments described herein provide enhanced computer- and network-based methods, techniques, and systems for presenting dynamically changing images in a limited display or rendering environment. Example embodiments provide a client-side display manager ("client display manager") configured to present a dynamically changing image on a client device without use of, or with limited or no access to, a frame buffer for displaying image data. In one embodiment, the client display manager receives a plurality of image blocks that represent changes (e.g., updates, deltas, modifications) to a temporally dynamic image. The temporally dynamic image may be any image that changes over time, such as a user interface screen or display, an animation, a video stream, a remoted desktop user interface, or the like. The client display manager operates in an environment in which it cannot access a frame buffer for presenting the received image blocks on a display. Instead, the client display manager layers the image blocks and then causes the layered images to be rendered as a single, composited image on the display.

Figure 1:
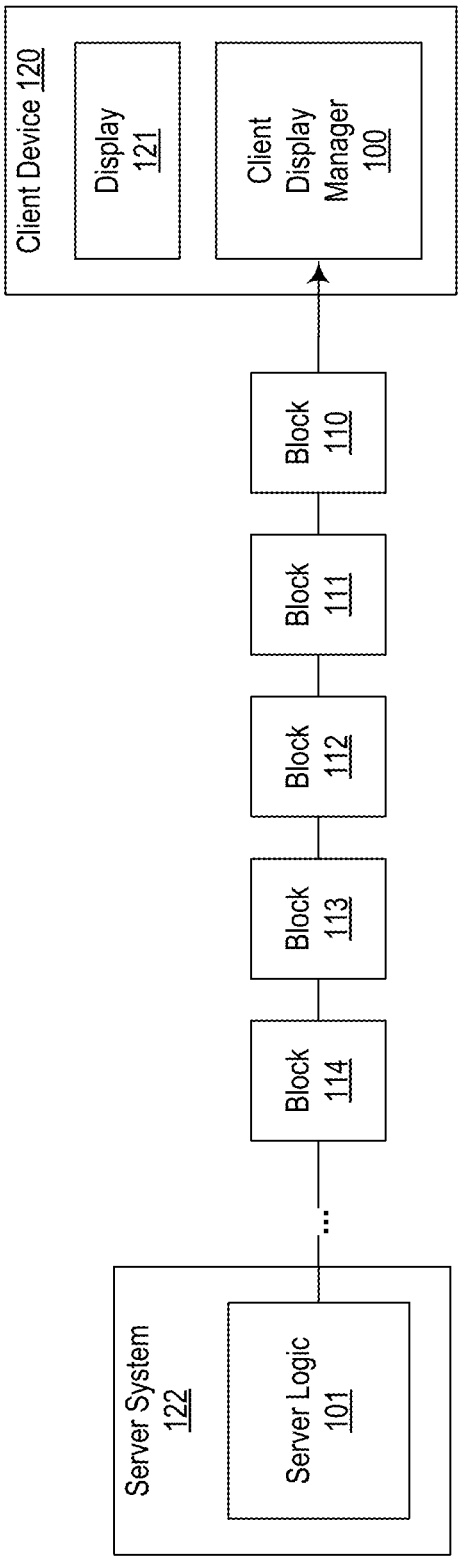
FIG. 1 is an example block diagram illustrating data flows between a server system and a client device according to an example embodiment.

FIG. 1 is an example block diagram illustrating data flows between a server system and a client device according to an example embodiment. In FIG. 1, a client display manager 100 executes on a client device 120 that includes a display 121. The client display manager 100 executes within a limited display environment, such that it does not have access to, or has limited access to, a hardware or software frame buffer associated with the display 121, even though such a frame buffer may exist at some lower level of the client device 120.

Server logic 101 executes on server system 122. The server logic 101 transmits a sequence of image blocks 110-114 to the client display manager 100. In some embodiments, the client display manager 100 (or some other module on the client device 120) may first request such blocks from the server logic 101, such as by making an HTTP request. In other embodiments, the server logic 101 may initiate a connection to the client display manager 100 in order to start transmission of image blocks. At least some of the image blocks 110-114 may represent updated or modified portions of a dynamically changing image, while others of the image blocks 110-114 represent entire "snapshots" (or "key frames") of the dynamically changing image. For example, where the dynamically changing image is an animation, the first block (block 110) transmitted to the client display manager 110 may be a key frame in that it represents a snapshot of the entire image taken at one point in time. The subsequently transmitted image blocks (blocks 111-114) may represent portions of the dynamically changing image that have changed or otherwise been modified.

Upon receiving each of the image blocks 110-114, the client display manager layers each of the received image blocks upon one another and causes the layered image blocks to be presented (e.g., rendered, displayed) as a single, composited image on the display 121. In at least some embodiments, when the layered image blocks are presented as a single image, at least some portion of each of the layered image blocks are visible in the presented single image. In other words, given a first and second received image block, a portion of each of the first and second image block may be visible in the single resulting image presented on the display 121. Presenting a single, composited image may be performed partially or entirely externally to the client display manager 100, such as by software and/or hardware that is part of the client device 120, but is external to the client display manager 100. Accordingly, causing such presentation to occur may include initiating a presentation operation, such as by invoking a screen update or redraw, modifying a document model, or the like.

Typically, the client display manager 100 will be a component or module of a larger application or system executing on the client device 120. In one embodiment, the client display manager 100 executes within the context of a Web browser of the client device 120 and facilitates access to a code module (implementing an application or system) that is hosted or at least partially executes on a remote system, such as server system 122. For example, the remote code module may be an operating system user interface (e.g., a "desktop"), such as user interface to a virtual machine, or may be an interface of an application executing remotely. In such an embodiment, the client display manager 100 manages the display of a user interface screen for such remote code hosted by the server system 122. As a user interacts with the user interface screen, user input events are generated and transmitted from the client device 120 to the server system 122. These user input events cause corresponding changes in the user interface screen (e.g., opening a dialog box, dropping down a menu, selecting a control, modifying text), which are then transmitted as one or more of image blocks 110-114 from the server system 122 to the client display manager 100.

In some embodiments, the transmission of image blocks from the server system 122 to the client display manager 100 does not occur responsive to user input. For example, where the server system 122 is transmitting a video or animation to the client display manager 100, at least some image blocks may be transmitted solely at the initiation of the server system 122 and not based on requests or user input events received from the client display manager 100.

Co-pending U.S. patent application Ser. No. 13/162,365, entitled "DELIVERY OF A USER INTERFACE USING HYPERTEXT TRANSFER PROTOCOL," filed on Jun. 16, 2011, illustrates techniques for providing communication between a client device and a server system to display a remoted user interface in this manner. This application is incorporated herein by reference in its entirety.

For example, in a Web-based remote execution embodiment, the client display manager 100 may be implemented as JavaScript code executing within a Web browser of the client device 120. The JavaScript runtime of the Web browser does not have direct access to a frame buffer of the display device 121 (if such even exists) and thus executes within a limited display environment. Instead, the JavaScript runtime has access to an HTML document that is currently presented by the Web browser, via a Document Object Model ("DOM") tree that represents the HTML document. Elements of the HTML document (e.g., DIV, TABLE, IMG) may be presented in a layered manner, by modifying style attributes of those elements. Style attributes may be modified by way of Cascading Style Sheet ("CSS") selectors or related operations. In such an embodiment, the client display manager 100 can accomplish the layered presentation of received image blocks by dynamically adding received image blocks (e.g., updated image information) as image elements to a currently presented HTML document, and then modifying style attributes of the added image elements to control their presentation in a layered manner. One possible HTML/CSS implementation is described further with respect to FIGS. 3A-3F and Tables 1-5, below.

The following description further describes techniques for presenting dynamically changing images in a limited display environment such as the one illustrated in FIG. 1. While some of the techniques are described primarily with respect to Web-based (HTML and CSS) presentation of a dynamically changing image as examples, other languages or environments may be used instead or in addition. For example, the described techniques may be implemented via ActionScript code executing in an Adobe Flash player or other environment. In some environments, the described techniques may be employed even when a canvas or other frame buffer abstraction is provided, because the layering technique may be more efficient than use of the canvas. As a general matter, the described techniques may be employed within any environment that provides a layering or compositing operation or data structure configured to cause the presentation of two or more images as a single image on a display device.

Figure 2:
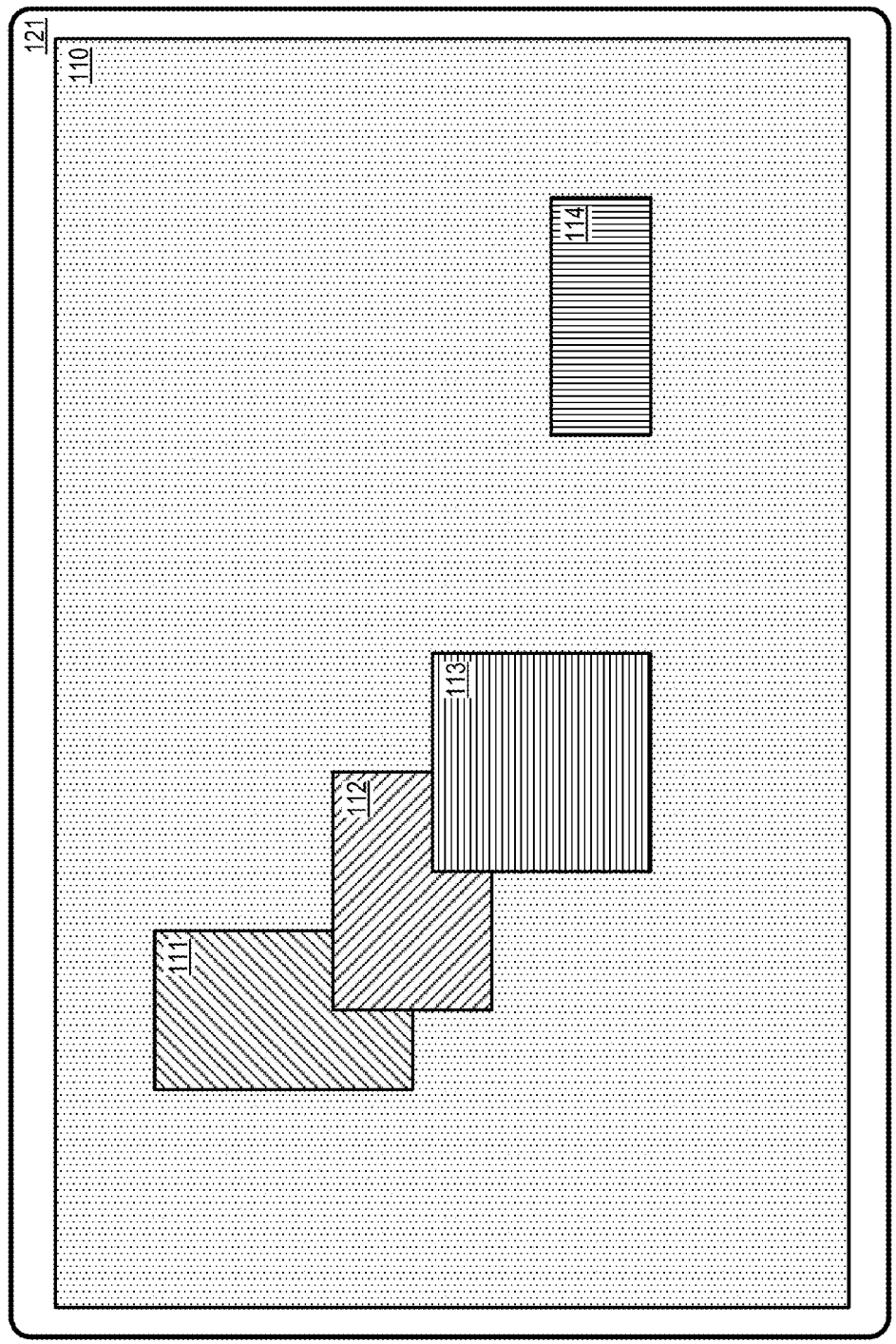
FIG. 2 is an example screen display illustrating layered image blocks according to an example embodiment.

FIG. 2 is an example screen display illustrating layered image blocks according to an example embodiment. In particular, FIG. 2 shows blocks 110-114 described with reference to FIG. 1 presented upon display 121. In this example, block 110 serves as a key frame, in that it represents, for example, an entire user interface screen when it is first opened by a user. Key frames may be also transferred from the server system 122 to the client display manager 100 at subsequent times as described below. Subsequently received blocks 111-114 represent modifications or updates to portions of the key frame and are respectively layered upon one another by the client display manager 100.

FIGS. 3A-3F illustrate a sequence of image block layering configurations generated by an example embodiment. In particular, FIGS. 3A-3F are each visualizations of a layering data structure used by the client display manager 100 to layer the received image blocks 110-114 described above. In each of FIGS. 3A-3F, the layering data structure is depicted as a vertical column of layers numbered from 0 to 4, representing a five-deep layering data structure.

Each of FIGS. 3A-3E show the layering data structure after a respective one of image blocks 110-114 has been received by the client display manager 100 and added to the layering data structure. In particular, FIG. 3A shows image block 110 assigned to layer 0 at a first time. Table 1, below, includes a listing of HTML and CSS code that could be used by a JavaScript implementation to represent the layering shown in FIG. 3A. Again, as stated above, this code is exemplary—many other implementations may be used.

TABLE 1

```
<html>
<head>
<style>
   #b110 { z-index:0; top:0px; left:0px; position:fixed; }
</style>
</head>
<body>
   <img id="b110" src="110.jpg" />
```

TABLE 1-continued

```
   </body>
</html>
```

In the listing of Table 1, a single image element is represented and identified as "b110." This image element corresponds to block 110, and is situated, by way of a CSS rule, at a z-index (layer) of 0, and a fixed screen position of (0, 0).

FIG. 3B shows image blocks 110 and 111 respectively assigned to layers 0 and 1 at a second time. Table 2, below, includes a listing of HTML and CSS code that could be used by a JavaScript implementation to represent the layering shown in FIG. 3B.

TABLE 2

```
<html>
<head>
<style>
   #b110 { z-index:0; top:0px; left:0px; position:fixed; }
   #b111 { z-index:1; top:30px; left:50px; position:fixed; }
</style>
</head>
<body>
   <img id="b110" src="110.jpg" />
   <img id="b111" src="111.jpg" />
</body>
</html>
```

The listing of Table 2 modifies that of Table 1 by adding a second image element identified as "b111." This image element corresponds to block 111, and is situated, by way of a CSS rule, at a z-index (layer) of 1, and a fixed screen position of (50, 30). Of note, the x, y location corresponds to the position illustrated in FIG. 2. Note that the images identified as b110 and b111 maintain their respective identities; they continue to exist as distinct, independent entities rather than being merged (e.g., copied, incorporated, blended, coalesced, etc.) into a single entity or buffer. Thus, they could be used or manipulated for other operations even after being composited for display.

FIG. 3C shows image blocks 110-112 respectively assigned to layers 0-2 at a third time. Table 3, below, includes a listing of HTML and CSS code that could be used by a JavaScript implementation to represent the layering shown in FIG. 3C.

TABLE 3

```
<html>
<head>
<style>
   #b110 { z-index:0; top:0px; left:0px; position:fixed; }
   #b111 { z-index:1; top:30px; left:50px; position:fixed; }
   #b112 { z-index:2; top:85px; left:70px; position:fixed; }
</style>
</head>
<body>
   <img id="b110" src="110.jpg" />
   <img id="b111" src="111.jpg" />
   <img id="b112" src="112.jpg" />
</body>
</html>
```

The listing of Table 3 modifies that of Table 2 by adding a third image element identified as "b112." This image element corresponds to block 112, and is situated, by way of a CSS rule, at a z-index (layer) of 2, and a fixed screen position of (70, 85).

FIG. 3D shows image blocks 110-113 respectively assigned to layers 0-3 at a fourth time. Table 4, below, includes a listing of HTML and CSS code that could be used by a JavaScript implementation to represent the layering shown in FIG. 3D.

TABLE 4

```
<html>
<head>
<style>
   #b110 { z-index:0; top:0px; left:0px; position:fixed; }
   #b111 { z-index:1; top:30px; left:50px; position:fixed; }
   #b112 { z-index:2; top:85px; left:70px; position:fixed; }
   #b113 { z-index:3; top:125px; left:100px; position:fixed; }
</style>
</head>
<body>
   <img id="b110" src="110.jpg" />
   <img id="b111" src="111.jpg" />
   <img id="b112" src="112.jpg" />
   <img id="b113" src="113.jpg" />
</body>
</html>
```

The listing of Table 4 modifies that of Table 3 by adding a fourth image element identified as "b113." This image element corresponds to block 113, and is situated, by way of a CSS rule, at a z-index (layer) of 3, and a fixed screen position of (100, 125).

FIG. 3E shows image blocks 110-114 respectively assigned to layers 0-4 at a fifth time. Table 5, below, includes a listing of HTML and CSS code that could be used by a JavaScript implementation to represent the layering shown in FIG. 3E.

TABLE 5

```
<html>
<head>
<style>
   #b110 { z-index:0; top:0px; left:0px; position:fixed; }
   #b111 { z-index:1; top:30px; left:50px; position:fixed; }
   #b112 { z-index:2; top:85px; left:70px; position:fixed; }
   #b113 { z-index:3; top:125px; left:100px; position:fixed; }
   #b114 { z-index:4; top:150px; left:300px; position:fixed; }
</style>
</head>
<body>
   <img id="b110" src="110.jpg" />
   <img id="b111" src="111.jpg" />
   <img id="b112" src="112.jpg" />
   <img id="b113" src="113.jpg" />
   <img id="b114" src="114.jpg" />
</body>
</html>
```

The listing of Table 5 modifies that of Table 4 by adding a fifth image element identified as "b114." This image element corresponds to block 114, and is situated, by way of a CSS rule, at a z-index (layer) of 4, and a fixed screen position of (300, 150).

In a typical implementation, a JavaScript-implemented client display manager 100 would typically dynamically generate and modify the illustrated HTML/CSS of Tables 1-5 above as a DOM tree. For example, the client display manager 100 would initially generate a DOM tree having a single image element corresponding to block 110 as shown in Table 1, and then modify the that DOM tree to reflect the listing shown in Table 2, and so on. In other embodiments, the client display manager 100 may a priori generate a DOM tree that includes "placeholder" image elements or containers (e.g., DIV elements) corresponding to each layer. Then, as image blocks are received, they may be efficiently assigned to or placed in corresponding containers. The elements and layering shown in FIG. 3E correspond to image blocks illustrated in FIG. 2.

FIG. 3F shows the layering data structure after a new key frame as been received and added to the layering data structure. In FIG. 3F, it is presumed that the layering data structure has reached its maximum capacity, in that it cannot support additional layers. At this point, a new key frame (represented here as image block 115) may be transmitted to the client display manager 100, which in turn clears the layering data structure and adds image block 115 at level 0. Clearing the layering data structure can be accomplished in various ways. In an HTML-oriented approach, elements corresponding to previously received layers may be removed from the DOM tree and/or elements may be hidden, undisplayed, or reordered, via appropriate modifications to CSS rules. In some embodiments, the maximum capacity of the layering data structure is determined a priori by the client display manager 100 and transmitted to the server logic 101, so that the server logic 101 can determine when to send key frames. In other embodiments, the client display manager 100 specifically requests key frames from the server logic 101 when the layering data structure is full (or upon some other condition), so that the server logic 101 need not track the state of the layering data structure.

Note that the above techniques differ from approaches that use a double-buffering approach. In a double-buffering approach, two images (buffers) are used, each of which typically represent an entire screen of image data. A first one of the two images is initially presented on the display. When a screen update is received, it is copied into the second image. The second image is then presented on the display. In the HTML/CSS context, such a double-buffering approach may be implemented by changing the z-order of DIV, IMG, or other HTML elements that contain the two buffer images. Various embodiments of the described techniques differ from double-buffering. For example, some embodiments do not copy screen updates into buffer images that include an entire display screen or user interface. In addition, some embodiments do not display screen updates by swapping (e.g., changing of the z-order or z-index of an image) layers, as is common in double-buffering.

Figure 4A:
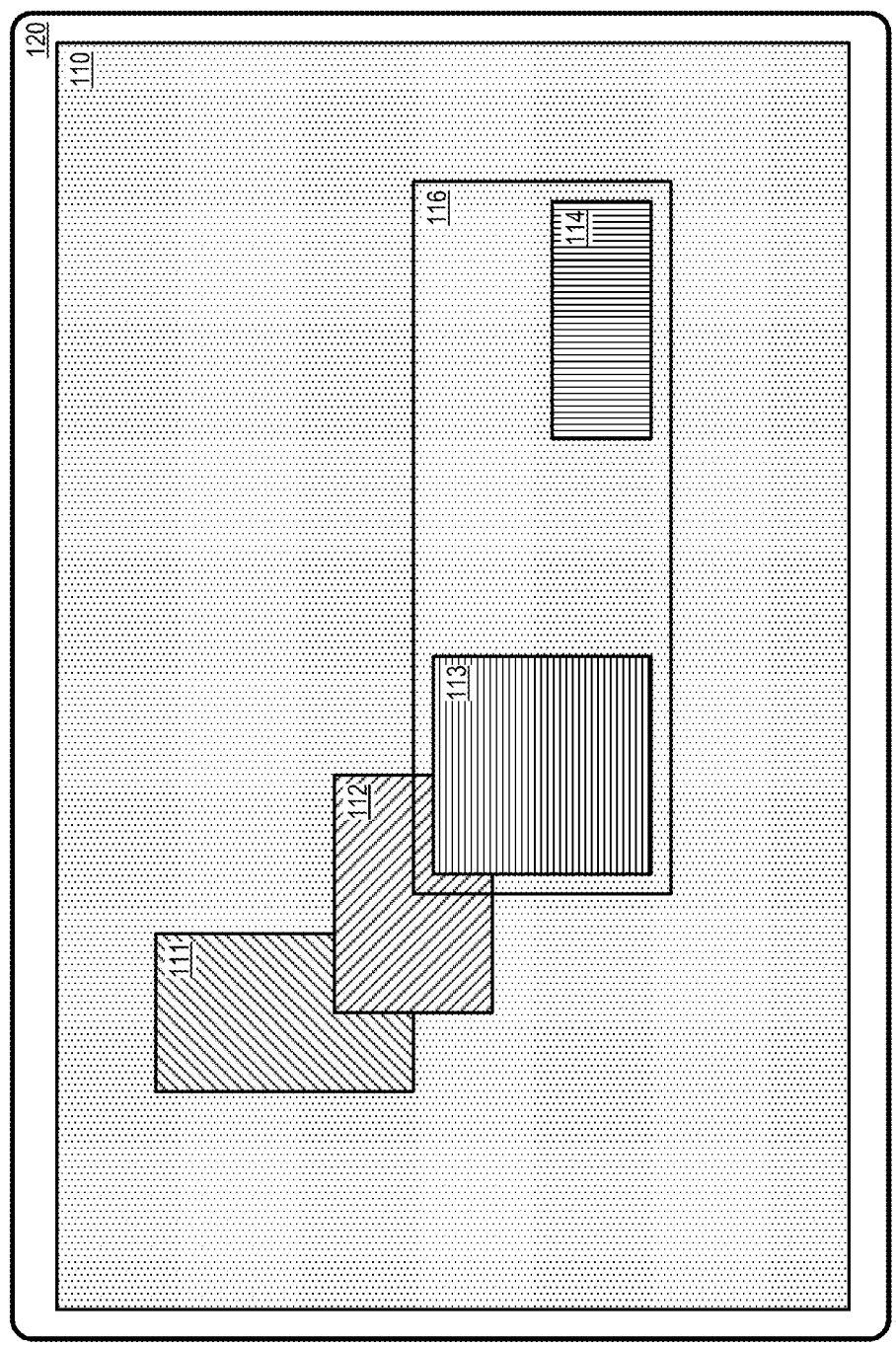
Figure 4B:
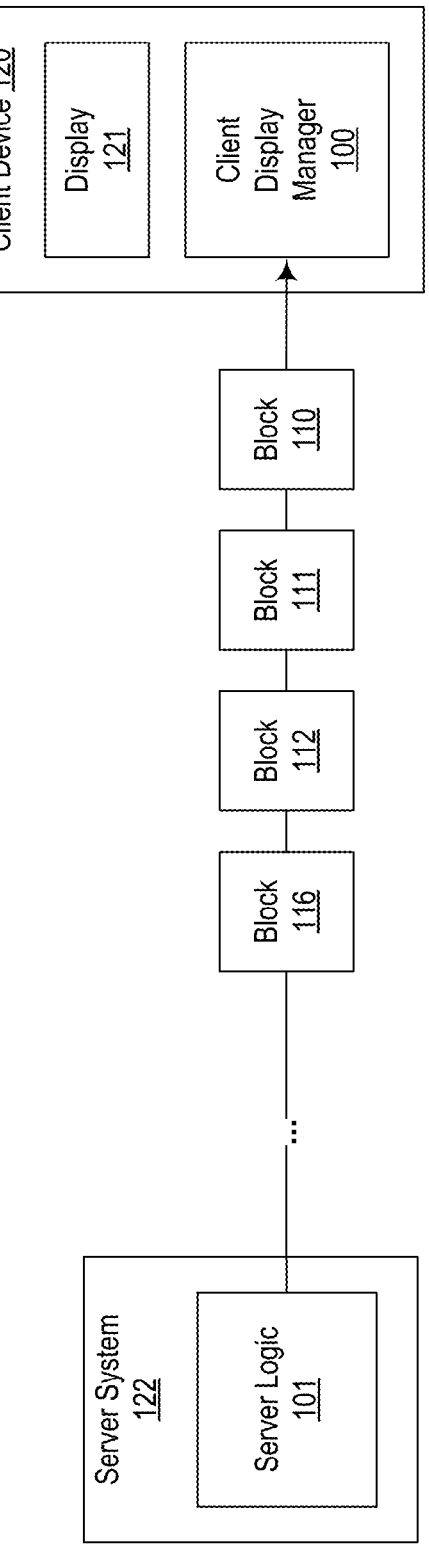

FIGS. 4A-4C illustrate image block coalescing performed by an example embodiment. In some embodiments, multiple image blocks may be coalesced or otherwise combined for transmission as a single image block that combines the multiple image blocks with transparent regions not occupied by the multiple image blocks.

By coalescing image blocks, multiple benefits may be obtained. In particular, coalescing image blocks may result in more judicious use of a layering data structure or other layering abstraction used by the client display manager 100. For example, where two image blocks are coalesced into a single transmitted image, only a single (rather than two) layer of the layering data structure need be occupied. By using fewer layers of the layering data structure, key frames (which may be orders of magnitude larger in size than the smaller update image blocks) may need to be sent less frequently, resulting in lower network bandwidth utilization and correspondingly improved throughput and/or latency.

Coalescing image blocks may result in improved network performance for other reasons. For example, where each image block is transmitted via an HTTP request-response interaction, coalesced image blocks will result in fewer HTTP requests (and hence network connections). When image blocks are small, such as when they are update image blocks, the overhead of an HTTP request may contribute significantly to the transmission time of an image block. Thus, by reducing the number of HTTP (or other protocol) requests, coalesced image blocks may again yield improved throughput and/or latency.

Such implementations assume that the server system is generating the transparency. In other examples, the server system sends separate updates but the client display manager 100 on the client device 120 generates the transparency and combines the discrete images with the generated transparency into a single image for the purpose of layering. Such examples may not improve network utilization but may provide layering optimizations. Other examples and implementations are possible.

FIG. 4A is an example screen display illustrating coalesced image blocks according to an example embodiment. In particular, as in FIG. 2, FIG. 4A shows blocks 110-114 presented upon display 121. However, in this example, blocks 113 and 114 are combined into block 116. Block 116 includes blocks 113 and 114, along with transparency in regions not inhabited by blocks 113 and 114. By using transparency in this manner, block 116 can be assigned to a single layer by the client display manager 100.

FIG. 4B illustrates data flows in the image coalescing example of FIG. 4A. In this example, blocks 110-112 and 116 are transmitted from the server logic 101 to the client display manager 100. Note, in contrast to FIG. 1, only four blocks (instead of five) are transmitted. As noted above, this may result in improved network utilization, particularly when each block is transmitted via a request-response protocol such as HTTP.

FIG. 4C show a layering data structure such as the one described with reference to FIGS. 3A-3F, above. In FIG. 4C, blocks 110-112 and 116 (containing blocks 113 and 114) are shown respectively assigned to layers 0-3. FIG. 4C, in which four layers are used to present the five blocks 110-114, thus stands in contrast to FIG. 3E, above, in which five layers are used to present the five blocks 110-114. As noted above, the technique illustrated in FIG. 4C results in better (lower) utilization of available layers in a layering data structure.

Figure 5:
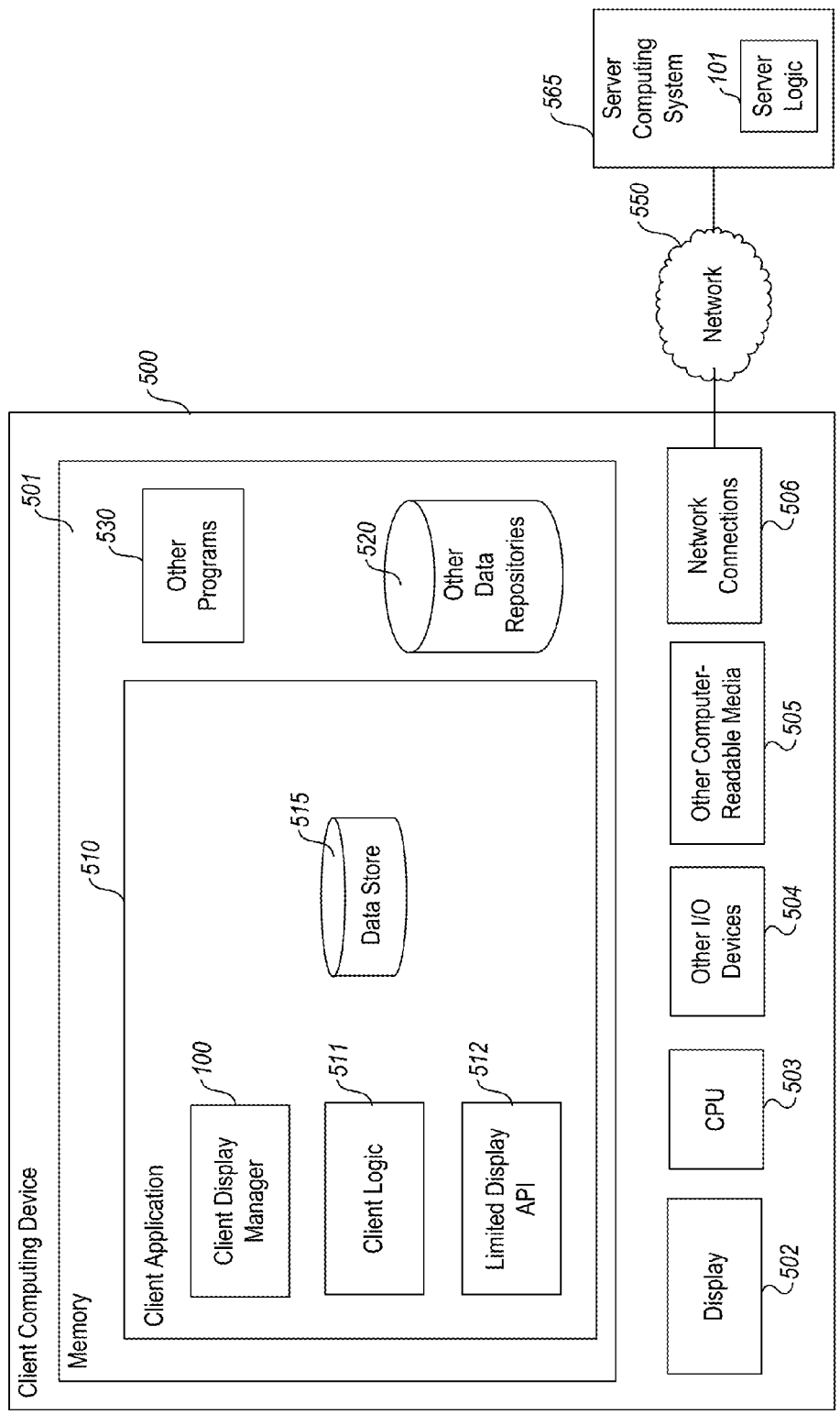
FIG. 5 is an example block diagram of an example client computing device that may be used to practice example embodiments.

FIG. 5 is an example block diagram of an example client computing device that may be used to practice example embodiments. Note that a general purpose or a special purpose computing device or system suitably instructed may be used to implement example embodiments. Further, embodiments may be implemented in software, hardware, firmware, or in some combination to achieve the capabilities described herein.

The computing device 500 may comprise one or more server and/or client computing systems and may span distributed locations. In addition, each block shown may represent one or more such blocks as appropriate to a specific embodiment or may be combined with other blocks. Moreover, various illustrated blocks may physically reside on one or more machines, which use standard (e.g., TCP/IP) or proprietary inter-process communication mechanisms to communicate with each other.

In the embodiment shown, computing device 500 comprises a computer memory ("memory") 501, a display 502, one or more Central Processing Units ("CPU") 503, Input/Output devices 504 (e.g., keyboard, mouse, CRT or LCD display, etc.), other computer-readable media 505, and one or more network connections 506. The client display manager 100 is shown residing in memory 501 a part of a client application 510. In other embodiments, some portion of the contents, some of, or all of the components of the client display manager 100 may be stored on and/or transmitted over the other computer-readable media 505. The components of the client application 510 including the client display manager 100 preferably execute on one or more CPUs 503. Other code or programs 530 and potentially other data repositories, such as data repository 520, also reside in the memory 501, and preferably execute on one or more CPUs 503. Of note, one or more of the components in FIG. 5 may not be present in any specific implementation. For example, some embodiments embedded in other software may not provide means for user input.

As noted the client display manager 100 is typically part of a client application, shown here as client application 510. In this example, client application 510 includes the client display manager 100, client logic 511, a limited display application program interface ("API") 512, and a data store 515. The client application 510 may be, for example, a Web browser-based or standalone remote-access client, configured to provide a user with remote access to an application or other code executing on server computing system 565. In other embodiments, the client application 510 may be an animation engine, a video client, or the like.

The client logic 511 may be any code or other logic that performs the core functions of the client application 510. For example, when the client application 510 is a remote-access application, the client logic 511 manages a remote-access session executing on server computing system 565.

The client display manager 100 performs functions as described herein. In some embodiments, it may receive image blocks from the server logic 101, and store the received image blocks in the data store 515. The client display manager 100 may then present the received image blocks on the display 502 using a layering data structure provided or managed by the limited display API 512.

The limited display API 512 provides at least indirect access to the display 502 by way of a layering data structure or other construct. For example, in a Web-based environment, the limited display API 512 may be an HTML rendering and layout engine of a Web browser that is controlled via CSS (e.g., layering and element positioning), JavaScript, and/or some other mechanism. As noted, in some embodiments, the API 512 may facilitate the described layering approach while also providing access to a frame buffer, canvas, or similar abstraction. However, because the described layering-based techniques may be more efficient in some cases, they may be preferably employed even in such cases.

In addition, the client application 510 may interact via a network 550 with the server logic 101 executing on the server computing system 565. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In other embodiments, instead of or in addition to the server computing system 565, image blocks may be received by the client display manager 100 within a peer-to-peer or point-to-point arrangement.

In an example embodiment, the illustrated components/modules are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported.

In addition, programming interfaces to the data repositories 515 and 520 can be available by standard means such as through C, C++, C#, and Java APIs; libraries for accessing files, databases, or other data repositories; through scripting languages such as XML; or through Web servers, FTP servers, or other types of servers providing access to stored data. The data stores 515 and 520 may be implemented as one or more database systems, file systems, or any other method known in the art for storing such information, or any combination of the above, including implementation using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (e.g., XML-RPC, JAX-RPC, SOAP), and the like. Other variations are possible. Also, other functionality could be provided by each component/module, or existing functionality could be distributed amongst the components/modules in different ways, yet still achieve the functions described herein.

Furthermore, in some embodiments, some or all of the illustrated components may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 6:
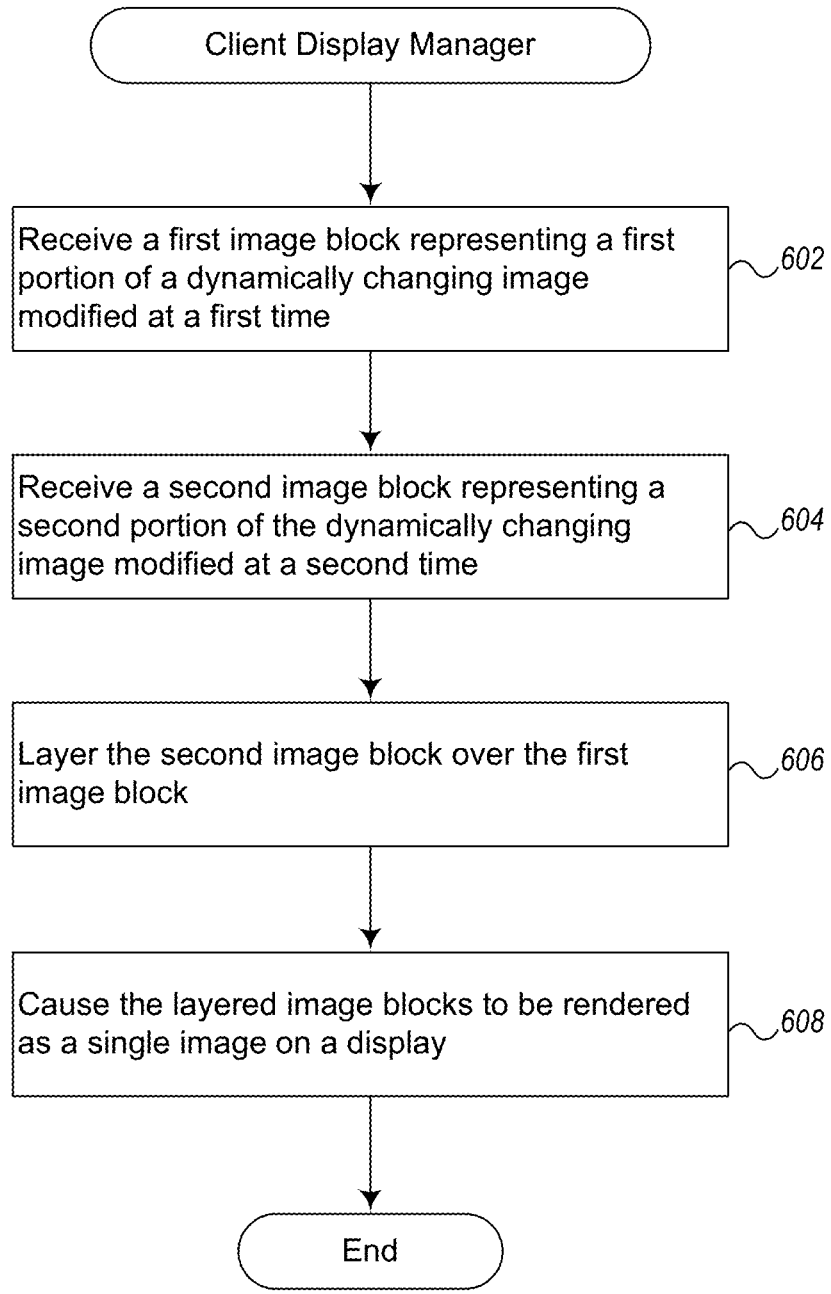
FIG. 6 is an example flow diagram of an example client display manager process performed according to an example embodiment.

FIG. 6 is an example flow diagram of an example client display manager process performed according to an example embodiment. The illustrated process may be implemented by, for example, the client display manager 100, described above. In some embodiments, the process executes in a module of a client device to present a dynamically changing image, where the module is not configured to directly access a frame buffer associated with a display of the client device.

The process begins at block 602, where it receives a first image block representing a first portion of a dynamically changing image modified at a first time. Receiving an image block may include receiving via a network an image block from a server-based application or other code. In other embodiments, image blocks may be received from a local component, such as a file system.

At block 604, the process receives a second image block representing a second portion of the dynamically changing image modified at a second time. The received first and second image blocks may represent portions of a user interface or other screen that have changed or otherwise been updated.

At block 606, the process layers the second image block over the first image block. Layering the image blocks may be accomplished by assigning the first and second image blocks to consecutive layers (e.g., the first and second layers or levels) in a layering data structure or other construct. Note that in some embodiments, image blocks may be assigned to layers as they are received. Thus, the first image block received at block 602 may be assigned to a first layer of a layering data structure, and then the second image block received at block 604 may be assigned to a second layer of the layering data structure. In other embodiments, two or more image blocks may be buffered or otherwise temporarily stored before being assigned to respective layers of the layering data structure. In an HTML-based embodiment, layering may be performed by way of CSS attributes modified by a JavaScript code or other mechanism.

At block 608, the process causes the layered image blocks to be rendered as a single image on a display. In an HTML-base embodiment, the display may be automatically updated whenever a style attribute of an element is modified. Thus, causing the layered image blocks to be rendered may include modifying style attributes of HTML elements corresponding to or including the received image blocks. In other cases, an explicit operation to refresh, redraw, or otherwise update the display may be invoked.

In other embodiments, other operations may be performed in addition to, or instead of, the above operations. For example, in one embodiment, a received image block may represent two distinct modified portions of a dynamically changing image, by including transparency in regions not occupied by the two distinct modified portions. In another embodiment, the process may determine that it is not possible to layer a received image block over previously received image blocks. In response to making the determination, the process may obtain (e.g., request transmission of) a key frame image block, and cause the key frame image block to be rendered on the display.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 13/162,365, entitled "DELIVERY OF A USER INTERFACE USING HYPERTEXT TRANSFER PROTOCOL," filed Jun. 16, 2011; and U.S. Provisional Patent Application No. 61/528,614, entitled "PRESENTING DYNAMICALLY CHANGING IMAGES IN A LIMITED RENDERING ENVIRONMENT," filed on Aug. 29, 2011, are incorporated herein by reference, in their entireties.

From the foregoing it will be appreciated that, although specific embodiments have been described herein for purposes of illustration, various modifications may be made without deviating from the spirit and scope of the invention. For example, the methods, systems, and techniques for presenting dynamically changing images discussed herein are applicable to architectures or environments other than a Web-based environment. Also, the methods, systems, and techniques discussed herein are applicable to differing protocols, communication media (optical, wireless, cable, etc.) and devices (such as wireless handsets, electronic organizers, personal digital assistants, tablet computers, smart phones, portable email machines, game machines, pagers, navigation devices such as GPS receivers, etc.).

The invention claimed is:

1. A method for rendering a dynamically changing image in a limited display environment, the method comprising:
   in a module of a web browser in a client device that has a display, the module not being configured to directly access a frame buffer associated with the display, presenting a dynamically changing image by,
      receiving, a first hypertext transfer protocol (HTTP) message from a server that contains a first image block that includes data of the dynamically changing image of a user interface of a virtual machine (VM) being modified on the server at a first time;
      generating a document object model (DOM) tree on the client device and adding the first image block as a first element in the DOM tree;
      receiving a second HTTP message from the server that contains a second image block including data of the dynamically changing image of the user interface of the VM being modified on the server at a second time that occurs subsequently to the first time;
      layering the second image block over the first image block in by adding to the DOM tree the second element corresponding to the second image block on the client;
      causing the layered image blocks of the layering data structure to be rendered as a single image on the display;
      determining that the layering data structure has reached its maximum capacity and cannot support additional layers; and
      causing the server to transmit a new key frame image block and using the new key frame image block to clear the layering data structure on the client device.

2. The method of claim 1 wherein presenting the dynamically changing image includes presenting a user interface screen for code executing on a remote server system, and wherein the screen dynamically updates in response to user inputs.

3. The method of claim 1, further comprising:
   receiving a third image block representing two distinct modified portions of the dynamically changing image, the third image block including transparency in regions not occupied by the two distinct modified portions;

layering the third image block over previously received image blocks; and causing the layered image blocks to be rendered as a single image on the display.

4. The method of claim 3 wherein the third image block including the transparency and representing the two distinct modified portions is received over a single HTTP network connection.

5. The method of claim 1 wherein the DOM tree is associated with an HTML document and accessed via a Cascading Style Sheet, wherein layering the second image block over the first image block includes assigning the first image block to a first z-index and assigning the second image block to a second z-index that is one higher than the first z-index, without copying either the first or the second image blocks into buffer images that represent all of the dynamically changing image.

6. The method of claim 1 wherein presenting the dynamically changing image is performed without use of double-buffering to display the first and second image blocks.

7. The method of claim 1 wherein presenting the dynamically changing image is performed without swapping buffer image layers.

8. The method of claim 1 wherein the module is JavaScript code executing within the Web browser executing on the client device.

9. The method of claim 1 wherein the client device includes a hardware frame buffer for the display, but the module accesses the display via an interface that does not provide any operations to copy image blocks into the hardware frame buffer.

10. The method of claim 1 wherein presenting the dynamically changing image includes presenting video transmitted from a remote server system to the client device.

11. The method of claim 1, wherein the first image block is a key frame that represents an entire user interface rendered by the server, and wherein the second image block represents a modification to a portion of the key frame.

12. The method of claim 1, wherein causing the server to transmit the new key frame image block further comprises:

determining the maximum capacity of the layering data structure by the client display manager; and transmitting information indicating the maximum capacity to the server, wherein the server uses the information indicating the maximum capacity received from the client device in order to determine when to send new key frame image blocks to the client device.

13. The method of claim 1, wherein causing the server to transmit the new key frame image block further comprises:

periodically detecting that the maximum capacity of the layering data structure has been reached on the client device; and transmitting a request from the client device to the server, requesting the new key frame image block to be transmitted from the server to the client device.

14. A non-transitory computer-readable medium including contents that, when executed, enable a computing device that has a display to present a dynamically changing image using a limited display environment, by performing a method comprising:

in a module on a web browser of the computing device, the module not being configured to directly access a frame buffer associated with the display, presenting a dynamically changing image by, receiving, a first hypertext transfer protocol (HTTP) message from a server that contains a first image block that includes data of the dynamically changing image of a user interface of a virtual machine (VM) being modified on the server at a first time;

generating a document object model (DOM) tree on the client device and adding the first image block as a first element in the DOM tree;

receiving a second HTTP message from the server that contains a second image block including data of the dynamically changing image of the user interface of the VM being modified on the server at a second time;

layering the second image block over the first image block in by adding to the DOM tree the second element corresponding to the second image block on the client;

causing the layered image blocks of the layering data structure to be rendered as a single image on the display, such that at least a portion of the first image block and a portion of the second image block become visible on the display;

determining that the layering data structure has reached its maximum capacity and cannot support additional layers; and causing the server to transmit a new key frame image block and using the new key frame image block to clear the layering data structure on the client device.

15. The computer-readable medium of claim 14 wherein the computer-readable medium is a memory in the computing device.

16. The computer-readable medium of claim 14 wherein the contents are instructions that when executed cause the computing device to perform the method.

17. The computer-readable medium of claim 14, wherein the method further comprises:

receiving a third image block representing two distinct modified portions of the dynamically changing image, the third image block including transparency in regions not occupied by the two distinct modified portions;

layering the third image block over previously received image blocks; and causing the layered image blocks to be rendered as a single image on the display.

18. The computer-readable medium of claim 14, wherein the first image block is a key frame that represents an entire user interface rendered by the server, and wherein the second image block represents a modification to a portion of the key frame.

19. The non-transitory computer-readable medium of claim 14, wherein causing the server to transmit the new key frame image block further comprises:

determining the maximum capacity of the layering data structure by the client display manager; and transmitting information indicating the maximum capacity to the server, wherein the server uses the information indicating the maximum capacity received from the client device in order to determine when to send new key frame image blocks to the client device.

20. The non-transitory computer-readable medium of claim 14, wherein causing the server to transmit the new key frame image block further comprises:

periodically detecting that the maximum capacity of the layering data structure has been reached on the client device; and transmitting a request from the client device to the server, requesting the new key frame image block to be transmitted from the server to the client device.

21. A computing system configured to present a dynamically changing image using a limited display environment, comprising:
a memory;
a display;
a frame buffer associated with the display; and
a module that is not configured to directly access the frame buffer, that is stored on the memory, and that is configured, when executed, to:
present a dynamically changing image by,
receiving, a first hypertext transfer protocol (HTTP) message from a server that contains a first image block that includes data of the dynamically changing image of a user interface of a virtual machine (VM) being modified on the server at a first time;
generating a document object model (DOM) tree on the client device and adding the first image block as a first element in the DOM tree;
receiving a second HTTP message from the server that contains a second image block including data of the dynamically changing image of the user interface of the VM being modified on the server at a second time that occurs subsequently to the first time;
layering the second image block over the first image block in by adding to the DOM tree the second element corresponding to the second image block on the client;
causing the layered image blocks of the layering data structure to be rendered as a single image on the display;
determining that the layering data structure has reached its maximum capacity and cannot support additional layers; and
causing the server to transmit a new key frame image block and using the new key frame image block to clear the layering data structure on the client device.

22. The computing system of claim 21 wherein the module includes software instructions for execution in the memory of the computing system.

23. The computing system of claim 21 wherein the computing system is a client computing device and the module is a client display manager.

24. The computing system of claim 21 wherein the computing system further comprises:
a client computing device that includes the memory;
a server computing system that transmits updated image blocks from the dynamically changing image to the client computing device.

25. The computing system of claim 24 wherein the server computing system and the client computing device communicate updated image blocks via HTTP networking protocol, wherein the client computing device transmits a request for updated image blocks via an HTTP request to the server computing system, and wherein the server computing system transmits image blocks to the client device in an HTTP response.

26. The computing system of claim 24 wherein the frame buffer is a hardware frame buffer for the display, but the module accesses the display via an interface that does not provide any operations to copy image blocks into the hardware frame buffer.

27. The computing system of claim 24 wherein the server computing system includes logic configured to transmit to the client computing device a single image blocks that includes multiple coalesced image blocks together with transparency in regions not occupied by the multiple coalesced image blocks.

28. The computing system of claim 21, wherein the module is further configured to:
receive a third image block representing two distinct modified portions of the dynamically changing image, the third image block including transparency in regions not occupied by the two distinct modified portions;
layer the third image block over previously received image blocks; and
cause the layered image blocks to be rendered as a single image on the display.

29. The computing system of claim 21, further comprising a layer data structure that is stored on the memory and that includes a first layer and a second layer, and wherein the module is further configured to layer the second image block over the first image block by:
associating the first image block with the first layer, without copying the first image block into a first buffer image that represents all of the dynamically changing image;
associating the second image block with the second layer, without copying the second image block into a second buffer image that represents all of the dynamically changing image; and
causing the DOM tree to be presented on the display, such that at least a portion of the first image block and a portion of the second image block become visible on the display.

30. The computing system of claim 21 wherein the first image block is a key frame that represents an entire user interface rendered by the server, and wherein the second image block represents a modification to a portion of the key frame.

* * * * *